(12) United States Patent
Klein et al.

(10) Patent No.: US 11,953,082 B2
(45) Date of Patent: Apr. 9, 2024

(54) PLANETARY TRANSMISSION WITH DIFFERENTIAL

(71) Applicant: Schaeffler Technologies AG & Co. KG, Herzogenaurach (DE)

(72) Inventors: Martin Klein, Scheinfeld (DE); Harald Martini, Herzogenaurach (DE); Thorsten Biermann, Wachenroth (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/625,910

(22) PCT Filed: Jul. 8, 2020

(86) PCT No.: PCT/DE2020/100598
§ 371 (c)(1),
(2) Date: Jan. 10, 2022

(87) PCT Pub. No.: WO2021/004584
PCT Pub. Date: Jan. 14, 2021

(65) Prior Publication Data
US 2022/0268345 A1    Aug. 25, 2022

(30) Foreign Application Priority Data
Jul. 8, 2019  (DE) .......................... 102019118370.7

(51) Int. Cl.
*F16H 37/08* (2006.01)
*F16H 48/11* (2012.01)
*F16H 48/10* (2012.01)

(52) U.S. Cl.
CPC .......... *F16H 37/082* (2013.01); *F16H 48/11* (2013.01); *F16H 2048/106* (2013.01)

(58) Field of Classification Search
CPC ... F16H 37/082; F16H 48/11; F16H 2048/106
See application file for complete search history.

(56) References Cited

U.S. PATENT DOCUMENTS

| 1,541,168 A | * | 6/1925 | Nambotin | ............... F16H 3/663 475/275 |
| 6,609,993 B2 | * | 8/2003 | Ohkubo | ............... F16H 57/082 475/331 |

(Continued)

FOREIGN PATENT DOCUMENTS

| CN | 104641150 A | 5/2015 |
| CN | 108136896 A | 6/2018 |

(Continued)

*Primary Examiner* — Derek D Knight
(74) *Attorney, Agent, or Firm* — Volpe Koenig

(57) ABSTRACT

A planetary transmission (1) with a differential (3) and at least one set of planetary gears (6) and with a common planetary carrier (9) for the differential (3) and the set of planetary gears (7) and with at least one set of planet journals (18). The planet journals (7) and first differential gears (11) of the differential (3) are seated so as to follow one another axially on in each case one planet journal (18) and, here, are axially separated from one another by way of the intermediate web (20). The intermediate web (20) which extends in radial directions runs axially between a first toothing plane (I) and a second toothing plane (II).

20 Claims, 2 Drawing Sheets

(56) References Cited

U.S. PATENT DOCUMENTS

| | | | | |
|---|---|---|---|---|
| 8,172,718 B2* | 5/2012 | Buchner | ............... | F16H 57/082 29/898.07 |
| 8,192,323 B2* | 6/2012 | Fox | ......................... | F03D 15/00 290/55 |
| 8,216,108 B2* | 7/2012 | Montestruc | ........... | F16H 57/082 475/331 |
| 10,920,864 B2* | 2/2021 | Voelkel | ................. | F16H 57/082 |
| 11,279,218 B2* | 3/2022 | Hibino | ................. | F16H 57/037 |
| 2009/0118051 A1 | 5/2009 | Bock et al. | | |

FOREIGN PATENT DOCUMENTS

| | | |
|---|---|---|
| DE | 102015214035 | 1/2017 |
| DE | 102016216785 | 3/2018 |
| DE | 102017107803 | 6/2018 |
| DE | 102017112341 | 8/2018 |
| EP | 2821672 | 12/2016 |
| WO | 2018153403 | 8/2018 |

\* cited by examiner

PLANETARY TRANSMISSION WITH DIFFERENTIAL

CROSS-REFERENCE TO RELATED APPLICATIONS

This application is the U.S. National Phase of PCT Appln. No. PCT/DE2020/100598, filed Jul. 8, 2020, which claims priority from German Patent Application No. 10 2019 118 370.7, filed Jul. 8, 2019, the entire disclosures of which are incorporated by reference herein.

TECHNICAL FIELD

The disclosure relates to a planetary transmission having a differential and at least one set of planetary gears and having a common planetary carrier for the differential and the set of planetary gears and having at least one set of planet journals.

BACKGROUND

An example of a generic differential or planetary transmission is disclosed in DE 10 2015 214 035 A1. The planetary transmission has a one-piece housing in which both a load step and the differential are accommodated. As is common in this type of spur gear differential, the differential gears of one planet set and the differential gears of the other planet set are seated on separate planet journals. The housing of the planetary transmission is designed in a stepped manner in the axial direction so that axially offset pockets are formed in the housing. The pockets are axially separated from one another by wall sections of the planetary transmission. The housing starts on the side of the load step with a first carrier web. Pockets, each for one of the double planets, immediately follow the first carrier web. Each of these pockets holds a double planet formed by two planetary gears. The pocket for the double planet is axially limited towards one side by the first carrier web and towards the other side by a wall section of the one-piece planetary carrier. On the other side of the planetary carrier, one long and one short differential gear sit in a common pocket and mesh with one another. The common pocket is divided into two space sections. Each pocket with the double planet is axially followed by a space section of the common pocket for a short differential gear. The pocket for the double planet and the space section for the short differential gear are axially separated from one another by an intermediate wall section of the planetary carrier. The space section for the short differential gear is limited axially in the direction of the first carrier web by the intermediate wall section and axially in the other direction by a section of the second carrier web. The second carrier web is a cover which is attached to the housing. The double planet and the short differential gear are seated on a common planet journal, which passes through the wall section, is supported on one side in the first carrier web, then also in the intermediate wall section and finally at the other end in the second carrier web. Circumferentially offset from this, one of the long differential gears is also seated in each of the common pockets in a second space section of the common pocket. The second space section is delimited in the direction of the first carrier web by a wall section which is axially offset from the first carrier web in the direction of the second carrier web, but axially set back further in the direction of the first carrier web than the intermediate wall section. This gives the common pocket its stepped shape. The long differential gears are each seated on a planet journal, which is seated axially towards one side in the wall section and towards the other side in the second carrier web.

SUMMARY

The object of the disclosure is to create a planetary transmission with a simple design.

The object is achieved by a planetary transmission having one or more of the features described herein.

According to the disclosure, it is provided that one planetary gear of the set of planetary gears as well as a first differential gear of the differential gears are seated so as to follow one another axially on a planet journal and are thereby axially separated from one another by way of the intermediate web. The intermediate web extending in radial directions runs axially between a first toothing plane and a second toothing plane.

By using the intermediate web between the respective double planet and the differential gear of the spur gear differential, the load of the differential gear is not transferred to the planetary bearing, but directly to the planetary carrier. The support width between the bearing points of the planet journal extending over the entire width of the planetary transmission from the left outer to the right outer carrier web is shortened by the further bearing point for the planet journal on the intermediate web. This also reduces the bending moment on the bearing of the planet journal in the planetary carrier and in the planet journal, which allows the planet journal to be thinner in diameter and the bearing of the planet journal on the carrier web to be designed to be less massive. In addition, both differential gears are equally loaded during driving operation, which means that the locking value in the differential is the same on both differential gears. In planetary transmissions or differentials with higher loads, the meshing of a set of differential gears and a set of planetary gears of the load step cannot always be arranged in a common toothing plane due to the size of the planetary gears and their solid design. The separation of the meshing of the two differential steps and that of the load step via the axial spacing of the toothing planes therefore offers more possibilities when designing the planetary transmission.

The power between the gears of the planetary transmission is transmitted via tooth contact on the flanks of its meshing teeth. Meshing is understood to mean the meshing of the teeth of a gear pair. The geometry of the tooth flanks is decisive for the load-bearing capacity of a mesh. Theoretically, the entire axial width of a gear or the teeth of the gear could be used as a basis for calculating the load-bearing capacity. In practice, however, the curvature of the tooth flanks, for example, as well as micro-defects in the geometry of the tooth flanks, result in deviations in the contact pattern. In addition, deformations in the planetary transmission under load and deviations from ideal dimensions during manufacturing create uneven load distributions on the tooth flanks. In addition, when designing the gearing, care is taken to ensure that the load on the teeth decreases at the end of the flank lines, i.e., towards the faces at the end of the teeth, in order to avoid edge loads and thus excessive stresses. The definition of the toothing plane for describing the embodiments therefore assumes an ideal state in which curvatures of the flanks and a not axially parallel course of the flank lines or curvatures of the flank surfaces as well as displacements of the tooth contact during operation of the planetary transmission are not taken into account. The toothing plane is therefore an imaginary radial plane perpendicularly penetrated by the central axis of the planetary transmission, which perpendicularly and centrally divides the theoretically (calculated and based on tooth design) effective tooth width in the middle, i.e., runs centrally through it. The respective contact lines or contact surfaces of the tooth flanks of spur toothing also penetrate this radial plane perpendicularly. For the respective flank lines or contact lines and contact surfaces with curved courses on helical toothing or involute toothing, the axial center of the projection of the contact surfaces and contact lines in the considered axial plane is taken as a basis.

In other words: the respective toothing plane runs through the center of the toothings of the meshing gears cut along their gear axis or the central axis of the planetary transmission.

The first toothing plane is therefore the radial plane that divides the tooth contact of the first differential gears in mesh with the first sun gear axially in the center and thus divides the effective tooth width of the first differential gears and at the same time of the first sun gear in the center.

The second toothing plane is the radial plane that divides the tooth contact of the second differential gears in mesh with the second sun gear and thus divides the effective tooth width of the second differential gears and at the same time of the second sun gear in the center.

The third toothing plane is the radial plane that divides the tooth contact of the set of planetary gears in mesh with at least one further arbitrary gear in the load step and thus divides the effective tooth width of the planetary gears of the set and the further arbitrary gear in the center. As one embodiment of the invention provides, the further gear is, for example, a ring gear. The third toothing plane is therefore the radial plane which divides the tooth contact of the first planetary gears of a double planet in mesh with the ring gear and thus the effective tooth width of the first planetary gears of the double planet and the ring gear in the center.

Thus, one embodiment provides that each of the planetary gears of the set is a first planetary gear of a double planet. The load step has a set of double planets. Each of the double planets has a second planetary gear in addition to the first planetary gear. The first and second planetary gears of each double planet are connected to one another in a rotationally fixed manner. The connection is either a one-piece, single material connection or individual planetary gears are joined to form a double planet.

A fourth toothing plane results as a radial plane which centrally divides the tooth contact of the second planetary gears of the double planet in tooth contact having at least one arbitrary further gear and thus the effective tooth width of the second planetary gears of the double planet and the arbitrary further gear. According to one embodiment, the arbitrary further gear with which the second planetary gears of the double planet are in mesh is a third sun gear.

The respective axial plane is the plane in which the central axis of the planetary transmission and at the same time the gear axis runs. The respective axial plane penetrates the toothing plane and runs perpendicularly through it. Axial, in the sense used herein, means therefore in the same direction as the central axis and radial means transversely perpendicular to the central axis. Accordingly, all radial planes are perpendicularly penetrated by the central axis and all radial distances are perpendicular distances to the axially aligned central axis.

A further embodiment provides that the meshing of the differential gears with one another lies in a radial plane which centrally intersects the meshing of the teeth and which lies in the first toothing plane. The advantage of this arrangement is that the differential can be made narrow to save on axial installation space. In general, in the interest of equal gear ratios on the left and right at the output of the differential, the aim is for the differential gears to have the same toothing geometry among each other and for the sun gears to have the same toothing geometry among each other. To ensure that the long differential gears and the sun gear in tooth contact with the short differential gears do not radially collide with one another, the difference in diameter is corrected for the above-mentioned exemplary embodiment by profile shifting of the toothing of the differential gears. On the other hand, a further embodiment of the invention provides that the meshes of the differential gears lie in a radial plane which intersects the meshes of these differential gears centrally and which lies axially between the first toothing plane and the second toothing plane. In this case, it is advantageous to use identical differential gears and identical sun gears in both sets as identical parts. This increases the batch size, especially of the planetary gears to be manufactured, which has a favorable effect on the manufacturing costs and stock-keeping for production readiness.

A further embodiment provides that the planet journal is designed to have two steps in regard to its diameter, wherein a first journal step is larger in diameter than a second journal step. Here, the first differential gears are each seated on the first journal step. Each of the double planets is seated on the second journal step. The advantage of this embodiment compared to the use of a planet journal having a continuous outer diameter is that the step of the planet journal forms a stop on the intermediate web if the through hole in the intermediate web has a diameter which corresponds in nominal dimension to the smaller outer diameter of the planet journal, i.e., the diameter of the second journal step, or is at least smaller than the outer diameter of the first journal step.

When mounting the planet journal in the planetary carrier, it is inserted into the first carrier web until the step of the planet journal comes into axial contact with the intermediate web. The planet journal therefore only needs to be fixed on one side by stamping or other type of plastic deformation, or be connected in a form-fitting or materially bonded manner. This simplifies the assembly of the planetary transmission and relieves the planetary carrier from the high forming forces that can occur when stamping on both sides.

DETAILED DESCRIPTION

Figure 1:
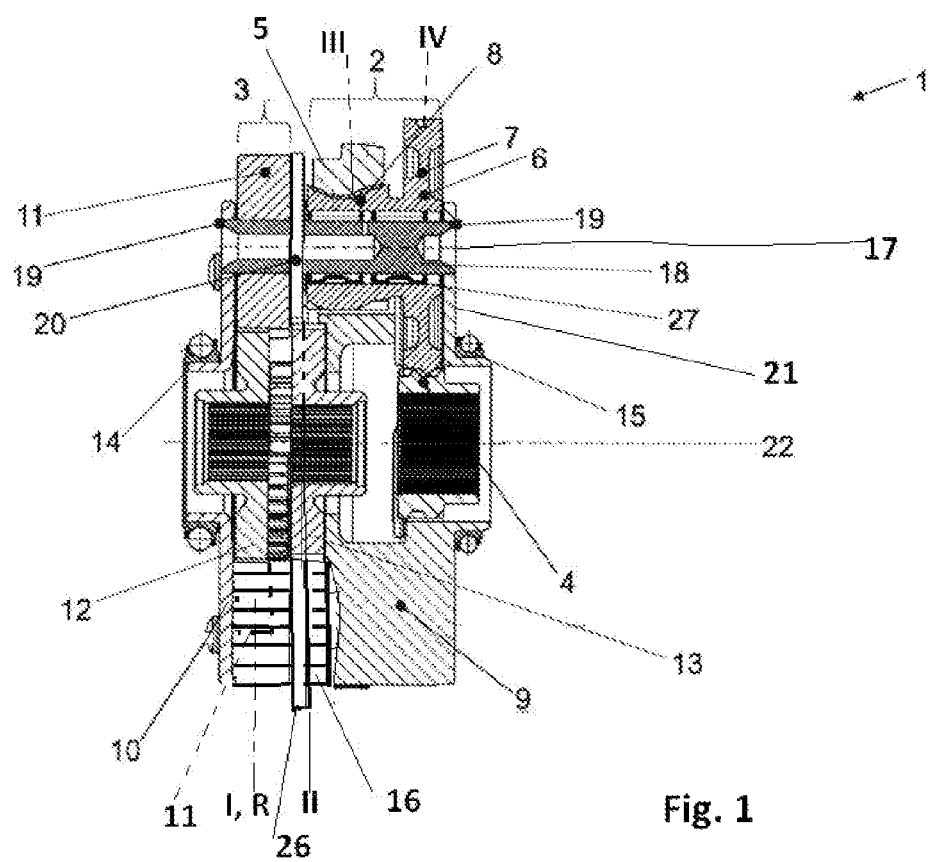
FIG. 1 is a longitudinal section view of an embodiment of the planetary transmission.

FIG. 1 shows a planetary transmission 1 in a longitudinal section along the central axis 22 of the planetary transmission 1.

The planetary transmission 1 consists of a load step 2 and a differential 3. The load step 2 has a third sun gear 4, which is the power input for the planetary transmission 1. The third sun gear 4 is in mesh with planetary gears 7 of double planets 6. In FIG. 1, only one double planet 6 is visible due to the sectional view. Each double planet 6 has a second planetary gear 8 which is connected in a non-rotatable manner to the first planetary gear 7 of the double planet 6 and is rotatably mounted with the latter about the respective journal axis 17 by means of planetary bearings 27 on a planet journal 18. A ring gear 5 is another component of load step 2. The ring gear 5 is in mesh with the second planetary gears 8 of the double planet 6.

The differential 3 comprises a first set of first differential gears 11 and a second set of second differential gears 16, a first sun gear 12 and a second sun gear 13. Of the set of first differential gears 11, only one differential gear 11 is visible in the illustration of FIG. 1 (above the central axis 22). Another differential gear 11 is hinted at by a dashed line below the central axis 22, because in this view it is hidden by a second differential gear 16 of the second set of differential gears 16. Of the second differential gears 16 of the set of second differential gears 16, only this one is visible. The first sun gear 12 in the image on the left is in mesh with the first differential gears 11 but is not in contact with the second differential gears 16. A radial distance therefore remains between the teeth of the first sun gear 12 and the teeth of the respective second differential gears 16 without coming into contact. The second sun gear 13 is in mesh with the second differential gears 16 but is not in contact with the first differential gears 11 because they cannot come into contact with the second sun gear 13 due to their small axial width. A first differential gear 11 is in mesh with a second differential gear 16. The first differential gears 11 are what are termed the narrow planetary gears of the differential 3. Their axial width is narrower by about half compared to the axial width of the second differential gears 16, which are referred to as wide planetary gears.

The meshing in the planetary transmission 1 can be divided into 4 toothing planes I to IV. In general, toothing planes are understood to be the position of the meshing of intermeshing gears in the respective imaginary radial plane perpendicularly penetrated by the central axis 22. The imaginary radial planes run perpendicularly into the representation and/or also perpendicularly out of it.

The toothing planes I and II are assigned to the meshes of the differential gears 11 and 16 respectively. The first toothing plane I is characterized by the meshing of the first sun gear 12 with the first differential gears 11. At the same time, the radial plane R characterized by the meshing of the first differential gears 11 with the second differential gears 16 lies in the same radial plane. The second differential gears 16 are axially wide enough to mesh with the second sun gear 13 in the second toothing plane II. The second toothing plane II is accordingly characterized by the meshing of the second sun gear 13 with the second differential gears 16. The radial plane R, which lies in the toothing plane I, is assigned to the meshing of the differential gears 11 and 16, which are in mesh with one another in pairs, as already mentioned previously. The meshes in the radial plane R are designed with a radial and tangential (to the circumferential direction around the central axis) distance to the meshes of the first sun gear 12 with the first differential gears 11.

The toothing planes III and IV are assigned to the meshing of the planetary gears of load step 2. The third toothing plane III is characterized by the meshing of the second planetary gears 8 of the double planet 6 with the ring gear 5. The fourth toothing plane IV results from the meshing of the first planetary gears 7 of the double planet 6 with the third sun gear 4.

The planetary transmission 1 is provided with a planetary carrier 9, which is provided with a carrier web 10 axially on the outer left in the image and with a carrier web 21 on the outer right in the image, as well as an intermediate web 20 according to the disclosure. The intermediate web 20 divides the differential 3 and runs axially between the first toothing plane I and the second toothing plane II.

The planetary transmission 1 has two sets of planet journals. In the illustration according to FIG. 1, only one planet journal 18 of one of the sets is visible. The planet journal 18 extends axially from the carrier web 10 through the intermediate web 20 to the carrier web 21 and is permanently supported in the carrier webs 10 and 21, and at least under load also in the intermediate web 20, and is fastened there with fastenings 19, for example by flanging, preferably by caulking or stamping.

The first differential gears 11 are arranged axially between the first carrier web 10 and the intermediate web 20. The second differential gears 12 extend axially through the intermediate web 20 (see the lower end 26 of the intermediate web 20) or alternatively laterally past the intermediate web (not shown) and are mounted at one end in the first carrier web 10 and at the other end in a wall section of the planetary carrier 9 not visible in FIG. 1.

A first differential gear 11 and a double planet 6 are each seated on a common planet journal 18. The respective differential gear 11 is axially separated from the second planetary gear 8 of the double planet 6 by the intermediate web 20. The double planet 6 is rotatably mounted on the planet journal 18 by means of planetary bearings 27. The differential gears 16 are each mounted on a different planet journal or supported by means of pins in the planetary carrier 9 so that they can rotate about their own planetary axis (not shown in the drawing). The planetary carrier 9 is rotatably mounted by means of rolling bearings 14 and 15 in a housing not shown, for example in a housing of a vehicle axle of an electric vehicle.

Figure 2:
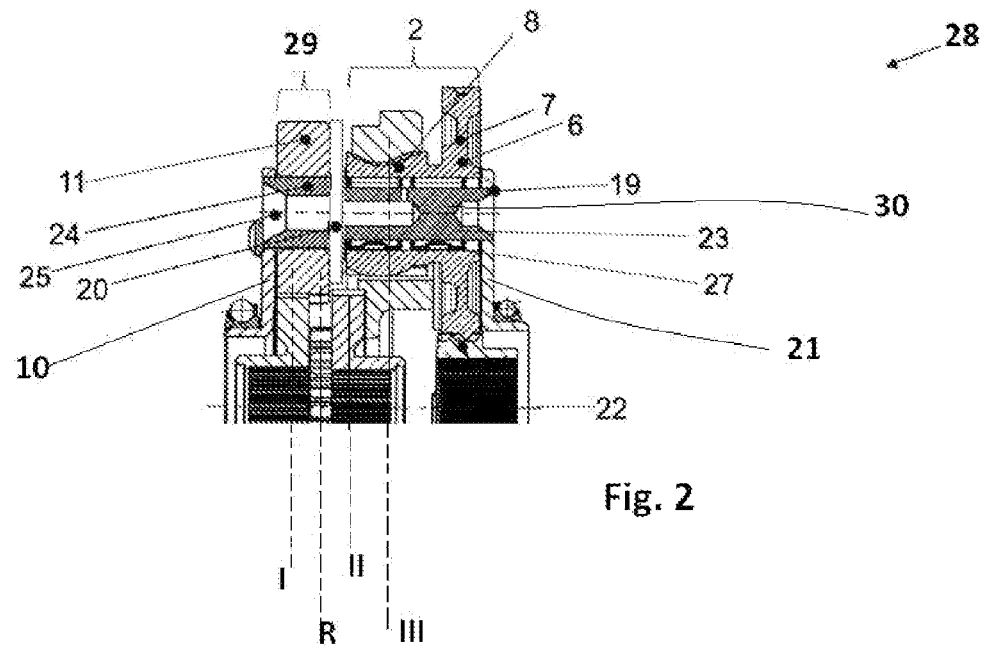
FIG. 2 shows another exemplary embodiment of a planetary transmission, the design of which essentially corresponds to that of the planetary transmission shown in FIG. 1.

FIG. 2 shows another exemplary embodiment of a planetary transmission 28, the design of which essentially corresponds to that of the planetary transmission 1 shown in FIG. 1. The difference lies in the design of the planet journals 18 and in the position of the radial plane R. The radial plane R with the tooth contacts of the differential gears 11 and 16 runs axially between the toothing planes I and II. The differential gears 16 are not visible due to the partial section shown in FIG. 2.

While the planet journals 18 in the differential 3 have the same diameter throughout, the planet journals 30 in the planetary transmission 28 are designed to have two steps with regard to the diameter. The first journal step 24 arranged in the differential 29 is larger in diameter than the second journal step 23 in load step 2. The inner diameter of the through hole in the intermediate web 20 corresponds in nominal dimension to the diameter of the second journal step 23. Since the diameter of the first journal step 24 is larger than that of the second journal step 23, the first journal step 24 will not fit axially through the through hole in the intermediate web 20 and will strike axially against the intermediate web 20. A fastening 19 of the planet journal 30 is optionally only necessary as shown on the right side of the second carrier web 21. Alternatively, only one fastening of the planet journal 30 to the first carrier web 10 can be provided (not shown). The planet journal 30 can be mounted in the carrier web 10 in an axially floating manner without the fastening or can only be pressed in. The same applies alternatively to a floating mounting of the planet journal 30 in the second carrier web 21.

Figure 3:
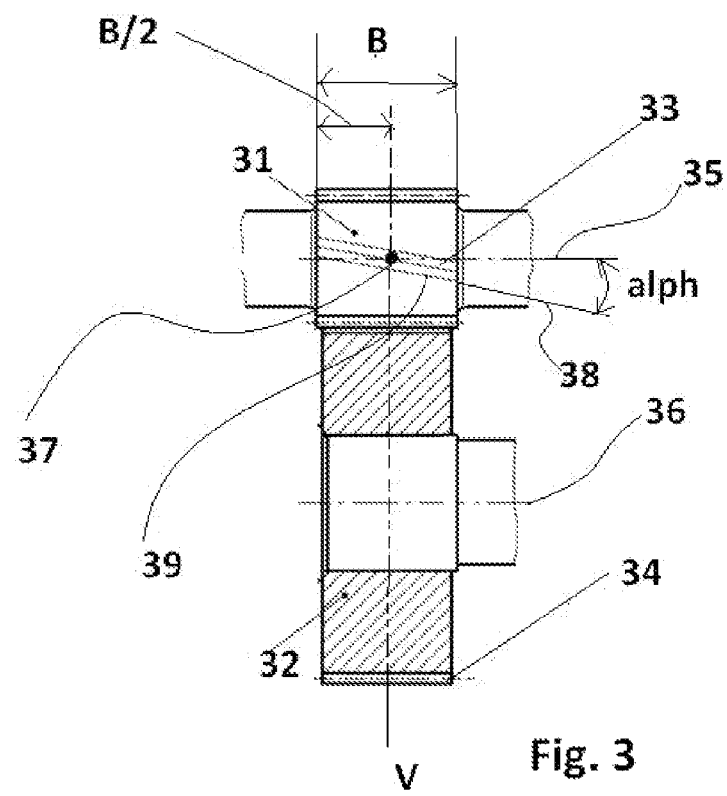
FIG. 3 schematically shows the meshing between a first and second gears.

FIG. 3 schematically shows the meshing between a first gear 31 and a second gear 32. The illustration generally serves to describe the position of a toothing plane V in the meshing of the gears 31 and 32. The two gears 31 and 32 are in mesh with one another via their helical toothing 34 and 35. The flank lines of the helical toothing 34 run curved in space and are marked with the reference numeral 39 in their projection into the image plane in FIG. 3. The imaginary extension of this projection 39 and the gear axis 35 of the first gear enclose a helix angle alpha of the helical toothing 34 or 35 between them. The center 37 of the meshing of both gears 31 and 32 lies in the toothing plane V. In the ideal case under consideration, the center 37 lies at half the width B/2 of the tooth width B or gears 31 and 32. It is therefore assumed that the tooth contact moves along the flank lines over the entire width B of the gears 31 and 32.

| Reference Symbols | |
|---|---|
| 1 | Planetary transmission |
| 2 | Load step |
| 3 | Differential |
| 4 | Third sun gear |
| 5 | Further gear, ring gear |
| 6 | Double planet |
| 7 | First planetary gear of the double planet |
| 8 | Second planetary gear of the double planet |
| 9 | Planetary carrier |
| 10 | Carrier web |
| 11 | First differential gear of the differential |
| 12 | First sun gear |
| 13 | Second sun gear |
| 14 | Rolling bearing |
| 15 | Rolling bearing |
| 16 | Second differential gear of the differential |
| 17 | Journal axis |
| 18 | Planet journal |
| 19 | Fastening |
| 20 | Intermediate web |
| 21 | Carrier web |
| 22 | Central axis of the differential or planetary transmission |
| 23 | Second journal step |
| 24 | First journal step |
| 25 | Fastening |
| 26 | Lower end of the intermediate web |
| 27 | Planetary bearing |
| 28 | Planetary transmission |
| 29 | Differential |
| 30 | Planet journal |
| 31 | First gear |
| 32 | Second gear |
| 33 | Helical toothing of the first gear |
| 34 | Helical toothing of the second gear |
| 35 | Gear axis of the first gear |
| 36 | Gear axis of the second gear |
| 37 | Center |
| 38 | Imaginary extension of the flank line |
| 39 | Projection of the flank line |
| I | First toothing plane |
| II | Second toothing plane |
| III | Third toothing plane |
| IV | Fourth toothing plane |
| alph | Helix angle |
| B | Width of the gear |
| B/2 | Half of the width of the gear |
| R | Radial plane |
| V | Toothing plane |

The invention claimed is:

1. A planetary transmission, comprising:
a differential (3);
at least one set of planetary gears (6);
a common planetary carrier (9) for the differential (3) and the set of planetary gears (7);
at least one set of planet journals (18);
the differential (3) has a set of first differential gears (11), a set of second differential gears (16), a first sun gear (12) and a second sun gear (13), the first differential gears (11) are each in mesh with the first sun gear (12) in a first toothing plane (I) and the second differential gears (16) are each in mesh with the second sun gear (13) in a second toothing plane (II), and one of the first differential gears (11) is in mesh with at least one of the second differential gears (16);
each of the first and second toothing planes is a radial plane which is perpendicular to a central axis and centrally intersects respectively the meshing of the first differential gears (11) with the first sun gear (12) or the meshing of the second differential gears (16) with the second sun gear (13);
a further set of the planetary gears are in mesh with at least one further gear in a third toothing plane, wherein the second toothing plane is positioned axially between the first toothing plane and the third toothing plane;
the planetary carrier (9) comprises a first carrier web (10), a second carrier web (21) and an intermediate web (20) formed axially between the first and second carrier webs, wherein the set of second differential gears extend axially through the intermediate web; and
in each case one planetary gear (7) of the set of planetary gears (7) and one first differential gear (11) of the first set of differential gears (11) is seated to follow one another axially on one planet journal (18) of the at least one set of planet journals and are axially separated from one another by the intermediate web (20), and the intermediate web (20) extends in radial directions running axially between the first toothing plane (I) and the second toothing plane (II).

2. The planetary transmission according to claim 1, wherein the third toothing plane is a radial plane extending perpendicular to the central axis and centrally intersecting a meshing of the planetary gears of the further set and the at least one further gear.

3. The planetary transmission according to claim 1, wherein the intermediate web extends axially between the first toothing plane and the third toothing plane.

4. The planetary transmission according to claim 1, wherein the individual toothing planes are axially separated from one another in an axial direction.

5. The planetary transmission according to claim 1, wherein the planet journal is axially supported at one end in the first carrier web, extends axially through the intermediate web to the second carrier web, and is supported at another end in the second carrier web.

6. The planetary transmission according to claim 1, wherein a radial plane centrally intersecting the meshing of the set of first differential gears and the set of second differential gears runs parallel to the first toothing plane and the second toothing plane.

7. The planetary transmission according to claim 6, wherein one of the meshes of the set of first differential gears and the set of second differential gears lies in the radial plane which centrally intersects the meshes of the set of first differential gears and the set of second differential gears and which lies in the first toothing plane.

8. The planetary transmission according to claim 6, wherein one of the meshes of the set of first differential gears and the set of second differential gears lies in the radial plane which centrally intersects the meshes of the set of first differential gears and the set of second differential gears and which extends axially between the first toothing plane and the second toothing plane.

9. The planetary transmission according to claim 1, wherein each of the planetary gears is a first planetary gear of a double planet, and a respective one of the double planets is formed by one of the first planetary gears and a second planetary gear.

10. The planetary transmission according to claim 9, wherein the planet journal has first and second journal steps in a diameter thereof, the first journal step is larger in diameter than the second journal step, and the first differential gears are each seated on the first journal step and each of the double planets is seated on the second journal step.

11. A planetary transmission, comprising:
a differential;
a set of planetary gears;
a common planetary carrier for the differential and the set of planetary gears;
a set of planet journals;
the differential has a set of first differential gears, a set of second differential gears, a first sun gear and a second sun gear, the first differential gears are each in mesh with the first sun gear in a first toothing plane and the second differential gears are each in mesh with the second sun gear in a second toothing plane, and one of the first differential gears is in mesh with at least one of the second differential gears;
the first and second toothing planes are radial planes that extend perpendicular to a central axis and centrally intersect respectively a meshing area of the first differential gears with the first sun gear and a meshing area of the second differential gears with the second sun gear;
the planetary carrier comprises a first carrier web, a second carrier web, and an intermediate web formed axially between the first and second carrier webs, wherein the set of second differential gears extend axially through the intermediate web; and
one planetary gear of the set of planetary gears and one first differential gear of the set of first differential gears are located on a same one of the planet journals, axially separated from one another by the intermediate web;
wherein the planet journals each have first and second journal steps in a diameter thereof, the first journal step is larger in diameter than the second journal step, and the first differential gears are each seated on the first journal step and the planetary gears are each seated on the second journal step, and wherein each of the planet journals have at least one fastening at an end of the planet journal to secure the planet journal to the planetary carrier.

12. The planetary transmission according to claim 11, wherein planetary gears of a further set of the planetary gears are in mesh with at least one further gear in a third toothing plane, and the third toothing plane is a radial plane extending perpendicular to the central axis and centrally intersecting a meshing area of the planetary gears of the further set and the at least one further gear.

13. The planetary transmission according to claim 12, wherein the intermediate web extends axially between the first toothing plane and the third toothing plane.

14. The planetary transmission according to claim 12, wherein the first, second, and third toothing planes are axially separated from one another in an axial direction.

15. The planetary transmission according to claim 11, wherein the planet journals are each axially supported at one end in the first carrier web, extend axially through the intermediate web to the second carrier web, and are supported at another end in the second carrier web.

16. The planetary transmission according to claim 11, wherein a radial plane centrally intersecting the meshing area of the set of first differential gears and the set of second differential gears extends parallel to the first and second toothing planes.

17. The planetary transmission according to claim 16, wherein one of the meshing areas of the set of first differential gears and the set of second differential gears lies in the radial plane which centrally intersects the meshing area of the set of first differential gears and the set of second differential gears and which lies in the first toothing plane.

18. The planetary transmission according to claim 16, wherein one of the meshing areas of the set of first differential gears and the set of second differential gears lies in the radial plane which centrally intersects the meshing area of the set of first differential gears and the set of second differential gears and which extends axially between the first toothing plane and the second toothing plane.

19. The planetary transmission according to claim 11, wherein each of the planetary gears is a first planetary gear of a double planet, and a respective one of the double planets is formed by one of the first planetary gears and a second planetary gear.

20. A planetary transmission, comprising:
a differential;
a set of planetary gears;
a common planetary carrier for the differential and the set of planetary gears;
a set of planet journals;
the differential has a set of first differential gears, a set of second differential gears, a first sun gear, and a second sun gear, the first differential gears are each in mesh with the first sun gear in a first toothing plane, and the second differential gears are each in mesh with the second sun gear in a second toothing plane, and one of the first differential gears is in mesh with at least one of the second differential gears;
the first and second toothing planes are radial planes that extend perpendicular to a central axis and centrally intersect respectively a meshing area of the first differential gears with the first sun gear and a meshing area of the second differential gears with the second sun gear;
the planetary carrier comprises a first carrier web, a second carrier web, and an intermediate web formed axially between the first and second carrier webs, wherein the set of second differential gears extend axially through the intermediate web; and
one planetary gear of the set of planetary gears and one first differential gear of the set of first differential gears are located on a same one of the planet journals, axially separated from one another by the intermediate web.

* * * * *